United States Patent
Kim et al.

(10) Patent No.: US 9,940,726 B2
(45) Date of Patent: Apr. 10, 2018

(54) SYSTEM AND METHOD TO IMPROVE OBJECT TRACKING USING TRACKING FINGERPRINTS

(71) Applicant: The Boeing Company, Chicago, IL (US)

(72) Inventors: Kyungnam Kim, Malibu, CA (US); Changsoo Jeong, Santa Monica, CA (US); Terrell N. Mundhenk, Malibu, CA (US); Yuri Owechko, Malibu, CA (US)

(73) Assignee: THE BOEING COMPANY, Chicago, IL (US)

( * ) Notice: Subject to any disclaimer, the term of this patent is extended or adjusted under 35 U.S.C. 154(b) by 138 days.

(21) Appl. No.: 14/577,983

(22) Filed: Dec. 19, 2014

(65) Prior Publication Data
US 2016/0180546 A1    Jun. 23, 2016

(51) Int. Cl.
*G06T 7/20*     (2017.01)
*G06T 7/292*    (2017.01)
*G06T 7/246*    (2017.01)
*G06T 7/73*     (2017.01)

(52) U.S. Cl.
CPC .............. *G06T 7/251* (2017.01); *G06T 7/248* (2017.01); *G06T 7/292* (2017.01); *G06T 7/74* (2017.01); *G06T 2207/10016* (2013.01)

(58) Field of Classification Search
CPC ......... G06T 7/248; G06T 7/251; G06T 7/292; G06T 7/74; G06T 2207/10016
See application file for complete search history.

(56) References Cited

U.S. PATENT DOCUMENTS

| | | | |
|---|---|---|---|
| 6,301,370 B1 * | 10/2001 | Steffens | G06K 9/00228 342/90 |
| 6,597,801 B1 * | 7/2003 | Cham | G06K 9/00369 345/474 |
| 7,587,064 B2 | 9/2009 | Owechko et al. | |
| 8,649,555 B1 * | 2/2014 | Bregler | G06K 9/00624 382/100 |
| 8,655,020 B2 | 2/2014 | Saptharishi et al. | |
| 8,811,670 B2 | 8/2014 | Mundhenk et al. | |
| 2003/0219146 A1 * | 11/2003 | Jepson | G06K 9/32 382/103 |

(Continued)

OTHER PUBLICATIONS

Mundhenk et al., "Detection of unknown targets from aerial camera and extraction of simple object fingerprints for the purpose of target reacquisition", 2012, Proc. SPIE 8301, Intelligent Robots and Computer Vision XXIX: Algorithms and Techniques, 83010H.*

(Continued)

*Primary Examiner* — Katrina Fujita
(74) *Attorney, Agent, or Firm* — Toler Law Group, PC

(57) ABSTRACT

A method includes receiving image data at a first tracking system. The image data may represent a region in an image of a sequence of images. The method includes generating a first tracking fingerprint based on the image data. The method includes comparing the first tracking fingerprint and a second tracking fingerprint. The method further includes providing an output from the first tracking system to a second tracking system based on a result of the comparison of the first tracking fingerprint and the second tracking fingerprint.

18 Claims, 9 Drawing Sheets

(56) References Cited

U.S. PATENT DOCUMENTS

| | | | |
|---|---|---|---|
| 2004/0167667 A1* | 8/2004 | Goncalves | G01C 21/12 |
| | | | 700/245 |
| 2006/0058604 A1 | 3/2006 | Avinash et al. | |
| 2009/0087085 A1* | 4/2009 | Eaton | G06F 15/16 |
| | | | 382/159 |
| 2009/0245573 A1* | 10/2009 | Saptharishi | G06K 9/00771 |
| | | | 382/103 |
| 2011/0243381 A1* | 10/2011 | Tsagkatakis | G06K 9/6215 |
| | | | 382/103 |
| 2011/0286627 A1* | 11/2011 | Takacs | G06K 9/4642 |
| | | | 382/103 |
| 2012/0011142 A1* | 1/2012 | Baheti | G06K 9/4671 |
| | | | 707/769 |
| 2012/0219176 A1* | 8/2012 | Guan | G06K 9/00355 |
| | | | 382/103 |
| 2013/0163815 A1* | 6/2013 | Mai | G06T 7/20 |
| | | | 382/103 |
| 2013/0272570 A1* | 10/2013 | Sheng | G06F 3/017 |
| | | | 382/103 |
| 2013/0322763 A1* | 12/2013 | Heu | G06T 7/004 |
| | | | 382/195 |
| 2014/0369555 A1 | 12/2014 | Zhong et al. | |
| 2015/0055821 A1* | 2/2015 | Fotland | G06K 9/3241 |
| | | | 382/103 |

OTHER PUBLICATIONS

Ni et al., "Manifold-based fingerprinting for target identification", 2012, 2012 IEEE Computer Society Conference on Computer Vision and Pattern Recognition Workshops, 1-6.*

Deans et al. "Combined feature based and shape based visual tracker for robot navigation." Aerospace Conference, 2005 IEEE. IEEE, 2005.*

Lee et al. "Real-time camera tracking using a particle filter and multiple feature trackers." Games Innovations Conference, 2009. ICE-GIC 2009. International IEEE Consumer Electronics Society's. IEEE, 2009.*

Babenko, et al., "Multiple Instance Learning with Manifold Bags", Proceedings of the 28th International Conference on Machine Learning, ICML-11, Bellevue, WA, 2011, 12 pages.

Birchfield, et al., "Spatiograms Versus Histograms for Region-Based Tracking", 2005 IEEE Computer Society Conference on Computer Vision and Pattern Recognition CVPR'05, vol. 2, IEEE, 2005, pp. 1158 through 1163.

Chang, et al., "A Robust Real-Time Video Stabilization Algorithm", Journal of Visual Communication and Image Representation, vol. 17, 2006, pp. 659 through 673.

Deans, et al., "Combined Feature Based and Shape Based Visual Tracker for Robot Navigation", Aerospace Conference, 2005 IEEE, Dec. 19, 2005, 8 pages.

Dinh, et al., "Context Tracker: Exploring Supporters and Distracters in Unconstrained Environments", Computer Vision and Pattern Recognition (CVPR), The Computer Vision Foundation, 2011, pp. 1177 through 1184.

Firouzi, et al., "Robust PCA-Based Visual Tracking by Adaptively Maximizing the Matching Residual Likelihood", 2013 International Conference on Computer and Robot Vision (CRV), IEEE, Piscataway, NJ, May 28-31, 2013, pp. 52 through 58.

Kalal, et al., "Tracking-Learning-Detection", IEEE Transactions on Pattern Analysis and Machine Intellegence, vol. 6, No. 1, IEEE, Piscataway, NJ, Jan. 2010, 14 pages.

Khosla, et al., "A Neuromorphic System for Object Detection and Classification", Signal Processing, Sensor Fusion, and Target Recognition, vol. 8745, SPIE, Bellingham, WA, Apr. 29, 2013, 8 pages.

Kim, et al., "Bio-Inspired Algorithms for Target Detection and Classification in Airborne Videos", Association for Unmanned Vehicle Systems International, North America, 2012, 11 pages.

Kullback, et al., "On Information and Sufficiency", The Annals of Mathematical Statistics, vol. 22, 1951, pp. 79 through 86.

Lowe, "Object Recognition from Local Scale-Invariant Features", Proceedings of the International Conference on Computer Vision, vol. 2, IEEE Computer Society, Washington, DC, 1999, pp. 1 through 8.

Mclaren, "XIII—The Development of the CIE 1976 (L* a* b*) Uniform Colour Space and Colour-Difference Formula", Journal of the Society of Dyers and Colourists, vol. 92, 1976, pp. 338 through 341.

Mundhenk, et al., "Detection of Unknown Targets from Aerial Camera and Extraction of Simple Object Fingerprints for the Purpose of Target Reacquisition", IS&T/SPIE Electronic Imaging, International Society for Optics and Photonics, San Francisco, CA, 2012, 14 pages.

Mundhenk, et al., "Distributed Biologically Based Real Time Tracking in the Absence of Prior Target Information", Optics East 2005, International Society for Optics and Photonics, SPIE, Boston, MA, 2005, pp. 330 through 341.

Nguyen, et al., "Tracking via Object Reflectance Using a Hyperspectral Video Camera", 2010 IEEE Computer Society Conference on Computer Vision and Pattern Recognition—Workshops, Jun. 13-18, 2010, 8 pages.

Ni, et al., "Manifold-Based Fingerprinting for Target Identification", 2012 IEEE Computer Society Conference on Computer Vision and Pattern Recognition Workshops, IEEE, 2012, pp. 1 through 6.

Sand, et al., "Particle Video: Long-Range Motion Estimation Using Point Trajectories", CVPR, Computer Vision and Pattern Recognition, 2006 IEEE Computer Society Conference on., IEEE, Jun. 2006, pp. 2195 through 2202.

Shen, et al., "Video Stabilization Using Principal Component Analysis and Scale Invariant Feature Transform in Particle Filter Framework", IEEE Transactions on Consumer Electronics, vol. 55, 2009, pp. 1714 through 1721.

Shi, et al., "Good Features to Track", IEEE Conference on Computer Vision and Pattern Recognition, IEEE, Piscataway, NJ, 1994, pp. 593 through 600.

* cited by examiner

SYSTEM AND METHOD TO IMPROVE OBJECT TRACKING USING TRACKING FINGERPRINTS

FIELD OF THE DISCLOSURE

The present disclosure relates to a system and method for tracking an object in a sequence of images.

BACKGROUND

Conventional tracking systems are configured to track a moving object in a sequence of images or video. For example, a tracking system may generate an initial model of an object in a first image of the sequence of images automatically or based on a user input indicating the object. The tracking system uses the initial model to track the object in subsequent images of the sequence of images and to determine a location of the object in the subsequent images. One type of tracking system is a non-adaptive tracking system that generates a single model of the object based on the first image and searches the subsequent images for matches to the model. A problem with the non-adaptive tracking system is that when one or more characteristics (e.g., size, illumination, color, orientation, shape, etc.) of the object change in the subsequent images, the non-adaptive tracking system may be unable to account for the changes and may lose track of the object in the subsequent images when the object is sufficiently different from the initial model.

An adaptive tracking system generates a model based on the object in a first image. However, the adaptive tracking system may modify (e.g., update) the model based on the subsequent images. By updating the model, the adaptive tracking system may continue to track the object even if a characteristic of the object changes. However, if the characteristic of the object changes substantially, or if the object is occluded (e.g., is partially or entirely covered or out of view) in the subsequent images, the adaptive tracking system may modify the model based on incorrect information (e.g., the model may be modified based on a different object that is mistaken for the object in a subsequent image). Once the adaptive tracking system has modified the model incorrectly, the adaptive tracking system tracks the incorrect object in the subsequent images, even if the correct object is no longer occluded. Thus, both the non-adaptive tracking system and the adaptive tracking system may have difficulties tracking objects that undergo substantial changes to one or more characteristics or that become temporarily occluded.

SUMMARY

An image processing system includes a first tracking system and a second tracking system. The first tracking system (e.g., a "Target Model Enhancement" (TME) system) uses one or more tracking fingerprints to track an object in a sequence of images and provides an output to the second tracking system. The first tracking system may receive image data indicating a region in an image of the sequence of images and may generate a first tracking fingerprint based on the image data. The first tracking fingerprint may be generated based on feature data extracted from the image data. The first tracking system may provide an output, such as an instruction or data, to the second tracking system based on a comparison of the first tracking fingerprint to a stored tracking fingerprint. The output may control or modify an operation of the second tracking system, such as causing an object model used by the second tracking system to be modified.

The first tracking system (e.g., the TME system) may receive image data from a motion detection system. The motion detection system may provide motion-triggered image data corresponding to region(s) in the image where motion is detected. Based on the comparison between the first tracking fingerprint and the stored tracking fingerprint and based on a confidence value received from the second tracking system, the first tracking system may provide one or more instructions as the output to the second tracking system. For example, when a difference between the first tracking fingerprint and the stored tracking fingerprint is below a first threshold value and when the confidence value indicates low confidence, the first tracking system may provide a location update instruction to cause the second tracking system to track the object at a new candidate location. As another example, when the difference is below a second threshold value and the tracking system has lost track of the object in the image, the first tracking system may provide an object model re-initialization instruction to cause the second tracking system to generate a new object model. Additionally, the first tracking system may store the first tracking fingerprint in a memory when the difference is less than a third threshold value. For example, when the tracking fingerprints are sufficiently similar (e.g., the difference is less than the third threshold value), the first tracking system may determine that the region in the image contains the object even though one or more characteristics of the object may have changed. The first tracking system may store the first tracking fingerprint in the memory in order to adapt to the changes to the one or more characteristics of the object.

Storing tracking fingerprints generated based on motion-triggered image data in the memory may enable the first tracking system to adapt to changes in the object in subsequent images of the sequence of images and may enable the first tracking system to continue tracking the object in situations when the second tracking system is unable to track the object, such as when a characteristic of the object changes substantially or when the object becomes occluded in one or more images of the sequence of images.

Additionally, the first tracking system (e.g., the TME system) may receive image data from the second tracking system. For example, the second tracking system may be an adaptive tracking system and may output image data to the first tracking system prior to modifying an object model used by the second tracking system. The first tracking system may generate the first tracking fingerprint based on the image data received from the second tracking system and may provide one or more instructions as the output to the second tracking system based on a comparison between the first tracking fingerprint and a stored tracking fingerprint. For example, when a difference between the first tracking fingerprint and the stored tracking fingerprint is less than a fourth threshold value, the first tracking system may provide a model update instruction as the output to cause the second tracking system to modify the object model. As another example, when the difference is greater than or equal to the fourth threshold value, the first tracking system may provide a prevent update instruction as the output to cause the second tracking system to refrain from modifying the object model. In this manner, the first tracking system may prevent the second tracking system from modifying the object model incorrectly and thus may increase an accuracy of the second tracking system.

In a particular embodiment, a method includes receiving image data at a first tracking system. The image data may represent a region in an image of a sequence of images. The method includes generating a first tracking fingerprint based on the image data. The method includes comparing the first tracking fingerprint and a second tracking fingerprint. The method further includes providing an output from the first tracking system to a second tracking system based on a result of the comparison of the first tracking fingerprint and the second tracking fingerprint.

In another particular embodiment, a tracking system includes one or more processors and a memory coupled to the one or more processors. The memory stores instructions that, when executed by the one or more processors, cause the one or more processors to perform operations including receiving image data representing a region in an image of the sequence of images. The operations include generating a first tracking fingerprint based on the image data. The operations include comparing the first tracking fingerprint and a second tracking fingerprint. The operations further include providing an output to a second tracking system based on a result of the comparison of the first tracking fingerprint and the second tracking fingerprint.

In another particular embodiment, a non-transitory computer readable medium includes instructions that, when executed by a processor, cause the processor to receive image data at a first tracking system. The image data may represent a region in an image of a sequence of images. The instructions cause the processor to generate a first tracking fingerprint based on the image data. The instructions cause the processor to compare the first tracking fingerprint and a second tracking fingerprint. The instructions further cause the processor to provide an output from the first tracking system to a second tracking system based on a result of the comparison of the first tracking fingerprint and the second tracking fingerprint.

The features, functions, and advantages that have been described can be achieved independently in various embodiments or may be combined in yet other embodiments, further details of which are disclosed with reference to the following description and drawings.

DETAILED DESCRIPTION

Particular embodiments of the present disclosure are described below with reference to the drawings. In the description, common features are designated by common reference numbers throughout the drawings.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Embodiments disclosed herein enable an image processing system that includes a first tracking system and a second tracking system. The first tracking system (e.g., a "Target Model Enhancement" (TME) system) may generate and store tracking fingerprints based on image data of a sequence of images. An initial tracking fingerprint is generated based on image data representing an object in a first image of the sequence of images, and the initial tracking fingerprint is stored in a memory. Additional tracking fingerprints may be generated based on feature data extracted from motion-triggered image data. When a tracking fingerprint (e.g., a tracking fingerprint that is generated based on motion-triggered image data) is sufficiently similar to a stored tracking fingerprint, the motion-triggered image data may represent the object after one or more characteristics of the object have changed, as compared to the appearance of the object in the first image. The tracking fingerprint may be stored in a memory so that the first tracking system maintains tracking fingerprints that correspond to the object after the one or more characteristics of the object change have changed. Additionally, the first tracking system may provide an output to the second tracking system to control an operation of the second tracking system.

Figure 1:
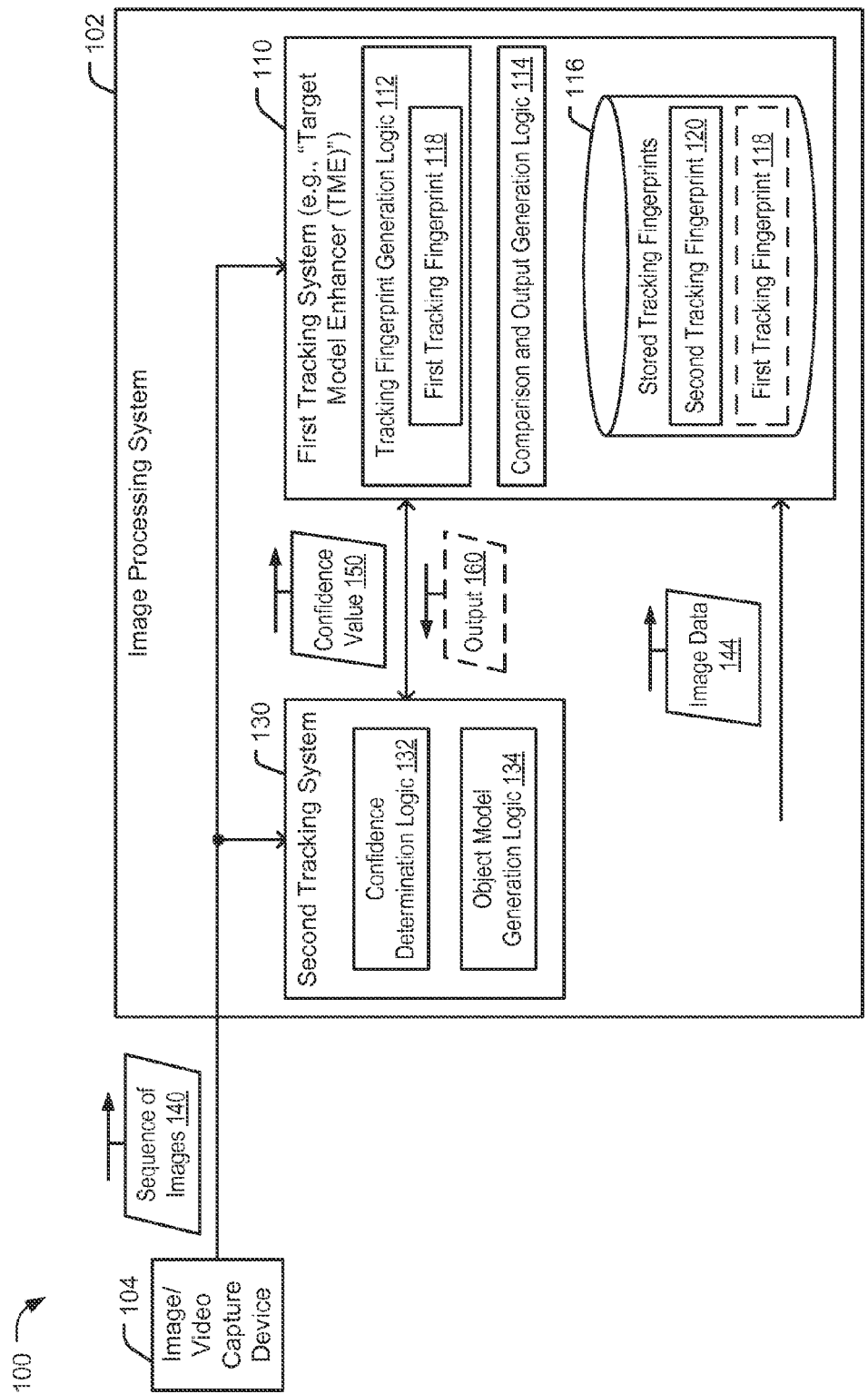
FIG. 1 is a block diagram that illustrates a particular embodiment of an image processing system including a first tracking system and a second tracking system.

FIG. 1 illustrates a particular embodiment of a system 100 including an image processing system 102 and an image (or video) capture device 104. The image processing system 102 may be coupled to the image (or video) capture device 104 and may be configured to receive and process a sequence of images 140 from the image (or video) capture device 104. The image (or video) capture device 104 may be any device capable of capturing sequences of images or video, such as a camera, a digital camera, a video camera, a still frame camera, an electro-optical (EO) image capture device, an infrared (IR) image capture device, a radar image capture device, a thermal image capture device, an ultrasound image capture device, a light detection and ranging (LIDAR) image capture device, or some other type of image capture device.

The sequence of images 140 may include camera images, digital images, frames of video, frames of digital video, EO images, IR images, radar images, thermal images, ultrasound images, LIDAR images, or other types of images. Although the image (or video) capture device 104 is illustrated as external to the image processing system 102, this is merely for convenience to illustrate that the image (or video) capture device 104 may be independent or distinct from the image processing system 102. In particular embodiments, the image (or video) capture device may be a component of the image processing system 102.

The image processing system 102 may be configured to process image data of the sequence of images 140 and to provide object tracking of an object in the sequence of images 140. The object may be indicated based on a user input (e.g., a user may select an object in an image via a user input device) or the object may be selected automatically by the image processing system 102 based on criteria stored at a memory accessible to the image processing system 102. To perform the object tracking, the image processing system 102 may include a first tracking system 110 and a second tracking system 130. The first tracking system 110 may be configured to maintain "tracking fingerprints" corresponding to the object in the sequence of images 140 and to support the second tracking system 130. The second tracking system 130 may be configured to track the object in the sequence of images 140. The object may be a moving object or an object that moves with respect to a field of vision of the image (or video) capture device 104. For example, a moving object may include a person that is walking or running, a vehicle (e.g., a car, a truck, a military vehicle, a watercraft, an aircraft, an autonomous aircraft, a spacecraft, a missile, a rocket, etc.), an object located on a moving vehicle, or some other type of moving object. As another example, the image (or video) capture device 104 may be coupled to an aircraft, such as an autonomous aircraft (e.g., a drone aircraft), and the object may move with respect to the field of vision of the image (or video) capture device 104 due to movement of the aircraft.

The first tracking system 110 may be configured to track the object in the sequence of images 140 by generating and storing one or more "tracking fingerprints." For example, the first tracking system 110 may include tracking fingerprint generation logic 112. The tracking fingerprint generation logic 112 may include digital logic or other hardware configured to generate tracking fingerprints based on received image data.

As used herein, a "tracking fingerprint" may be an identifier that represents an object in an image. The tracking fingerprint may be generated based on extracted feature data and one or more mathematical models. For example, to generate a tracking fingerprint, the tracking fingerprint generation logic 112 may extract data representing a number of features from the region of the image. The features may include edges of the object, lines of the object, textures of the object, or other features. The tracking fingerprint generation logic 112 may apply one or more mathematical models to the extracted feature data to generate the tracking fingerprint. Application of the one or more mathematical models may fit the extracted feature data to the one or more mathematical models. The one or more mathematical models may include parametric models (e.g., distributions that can be described using a finite number of parameters), non-parametric models (e.g., models that do not rely on distributions), spatially-aware models (e.g., models that take into account location, spatial orientation, and/or alignment of features), spatially agnostic models (e.g., models that do not take into account locations, spatial orientation, and/or alignment of features), or a combination thereof. For example, the mathematical models may include histograms, spatiograms, generalized linear models (GLMs), feature-only GLMs, other models, or a combination thereof.

In a particular embodiment, the tracking fingerprints are formed by applying GLMs of an "L*a*b" color space and feature entropy to the extracted feature data. The one or more mathematical models may be selected such that the tracking fingerprints are less effected by, or are not effected by (e.g., are invariant to), changes in rotation, scale, illumination, or color of the object. The tracking fingerprints may be referred to as "lightweight" tracking fingerprints because the tracking fingerprints may have a smaller data size than object model data used by other tracking systems.

One or more tracking fingerprints may be stored by the first tracking system 110 as stored tracking fingerprints 116. For example, the stored tracking fingerprints 116 may be stored in a memory accessible to the first tracking system 110. The stored tracking fingerprints 116 include an initial stored tracking fingerprint that is generated based on a region of a first image of the sequence of images 140 that includes the object. The stored tracking fingerprints 116 may also include one or more additional tracking fingerprints that represent the object in one or more other images of the sequence of images 140 after one or more characteristics of the object have changed (with respect to the appearance of the object in the first image). For example, the additional tracking fingerprints may be generated based on motion-triggered image data received from a motion detection system, as further described with reference to FIG. 2, and may be stored when differences between the additional tracking fingerprints and the stored tracking fingerprints 116 are less than a threshold value, as further described with reference to FIGS. 2 and 4. Storing tracking fingerprints that represent the object after the one or more characteristics have changed may enable the first tracking system 110 to adapt to further changes to the one or more characteristics in subsequent images of the sequence of images 140.

The first tracking system 110 may also include comparison and output generation logic 114. The comparison and output generation logic 114 may include hardware (e.g., an application-specific integrated circuit (ASIC)) configured to compare tracking fingerprints and to perform one or more actions (e.g., generating an output or storing a tracking fingerprint) based on a result of the comparison. For example, the comparison and output generation logic 114 may be configured to generate a tracking fingerprint based on received image data and to determine a difference between the tracking fingerprint and a stored tracking fingerprint (of the stored tracking fingerprints 116). The difference may be determined based on a distance measurement between the tracking fingerprint and the stored tracking fingerprint. In a particular embodiment, the difference is a Kullback-Leibler divergence value between the tracking fingerprint and the stored tracking fingerprint. Based on the difference, the comparison and output generation logic 114 may generate an output 160, may store the tracking fingerprint in the stored tracking fingerprints 116, or both. The output 160 may control an operation of the second tracking system 130, as further described herein. Because the output 160 may improve functionality of the second tracking system 130, such as by increasing an accuracy of the tracking performed by the second tracking system 130, the first tracking system 110 may be referred to as a "Target Model Enhancement" (TME) system.

The second tracking system 130 may be configured to track the object in the sequence of images 140 using one or more tracking algorithms or methodologies. For example, the second tracking system 130 may be a mean-shift tracking system, an absolute difference tracking system, a Kanade-Lucas-Tomasi (KLT) tracking system, or some other tracking system. The second tracking system 130 may include object model generation logic 134 configured to generate and store an object model based on the object in a first image of the sequence of images 140. As used herein, an object model may refer to data used by the second tracking system 130 to represent and to track the object, and the object model may be formatted in accordance with the particular tracking algorithm or methodology used by the second tracking system 130. The object model may be representative of the object in the first image. In particular embodiments, the second tracking system 130 may be an adaptive tracking system and the object model generation logic 134 may be configured to modify the object model to represent an appearance of the object in subsequent images of the sequence of images 140.

The second tracking system 130 may also include confidence determination logic 132. The confidence determination logic 132 may be configured to generate a confidence value 150 that indicates a likelihood that the object is being correctly tracked by the second tracking system 130 in an image of the sequence of images 140. For example, the second tracking system 130 may determine a location of the object in a particular image of the sequence of images 140, and the confidence determination logic 132 may generate the confidence value 150 that indicates a likelihood that the location of the object is correct. The confidence value 150 may be generated in accordance with the particular tracking algorithm or methodology used by the second tracking system 130. The second tracking system 130 may provide the confidence value 150 to the first tracking system 110. The confidence value 150 may be provided for each image of the sequence of images 140, or at a certain rate (e.g., once every x images, where x is an integer greater than one).

The second tracking system 130 may be configured to receive the output 160 from the first tracking system 110 and to control an operation based on the output 160. For example, the output 160 may include an instruction indicating whether an object model is to be modified, and the object model generation logic 134 may modify the object model or prevent modification of the object model based on the output 160 (e.g., the instruction). Other examples of the output 160 are described with reference to FIGS. 2 and 3.

During operation, the first tracking system 110 may receive image data 144. For example, the image data 144 may be motion-triggered imaged data received from a motion detection system, as described with reference to FIGS. 2 and 4, or the image data 144 may be received from the second tracking system 130 prior to the second tracking system 130 modifying an object model, as described with reference to FIGS. 3 and 5. Additionally, the second tracking system 130 may generate and provide the confidence value 150 to the first tracking system 110.

After receiving the image data 144, the tracking fingerprint generation logic 112 may generate a first tracking fingerprint 118 based on the image data 144. After generation of the first tracking fingerprint 118, the comparison and output generation logic 114 may compare the first tracking fingerprint 118 to a second tracking fingerprint 120 included in the stored tracking fingerprints 116 (e.g., by determining a difference between the first tracking fingerprint 118 and the second tracking fingerprint 120). Based on comparisons of the difference to one or more threshold values and based on a comparison of the confidence value 150 to a confidence threshold, the first tracking system 110 may generate and provide the output 160 to the second tracking system 130. For example, when the difference is less than one or more threshold values, and when the confidence value 150 is less than a confidence threshold value, the first tracking system 110 may provide the output 160 to the second tracking system 130. The output 160 may include one or more instructions and/or other data. For example, the output 160 may include motion-triggered image data and a location update instruction or an object model re-initialization instruction, as described with reference to FIGS. 2 and 4. As another example, the output 160 may include a model update instruction or a prevent update instruction, as described with reference to FIGS. 3 and 5.

The second tracking system 130 may control an operation, such as modification of an object model or output of location information, based on the output 160. Additionally, the second tracking system 130 may provide output data (e.g., location data representing a location of the object in the image to one or more other systems (not shown). For example, when the image processing system 102 and the image (or video) capture device 104 are integrated in an autonomous aircraft (e.g., a drone aircraft), the second tracking system 130 may provide output data (e.g., location data) to another system of the autonomous aircraft, such as a video capture device control system or a flight-path control system (e.g., a piloting system). As another example, the output data may be transmitted via one or more communication networks (e.g., a wireless communication network, a cellular communication network, a satellite network, etc.) to a server or a computing device of an operator of the autonomous aircraft.

Additionally, the first tracking system 110 may store the first tracking fingerprint 118 as one of the stored tracking fingerprints 116 based on a result of the comparison. For example, when the difference between the first tracking fingerprint 118 and the second tracking fingerprint 120 is less than a particular threshold value (e.g., a tracking fingerprint update threshold), the first tracking system 110 may determine that the first tracking fingerprint 118 represents the object with a change to one or more characteristics, and the first tracking fingerprint 118 may be stored. By storing tracking fingerprints (e.g., "updated" tracking fingerprints) that are similar to, but not the same as, the stored tracking fingerprints 116, the first tracking system 110 stores tracking fingerprints that represent the object as one or more characteristics (e.g., a rotation, an illumination, etc.) of the object change. As the one or more characteristics change further, a difference between the object in a subsequent image and an initial appearance of the object (e.g., in the first image of the sequence of images 140) may be large enough that the first tracking system 110 no longer recognizes the object. However, the difference between a tracking fingerprint based on the object in the subsequent image and one of the updated tracking fingerprints may be small enough that the first tracking system 110 continues to recognize the object even after further changes to the one or more characteristics.

Because the stored tracking fingerprints 116 include tracking fingerprints that represent the object after the one or more characteristics have changes, the first tracking system 110 may be able to control the second tracking system 130 and prevent the second tracking system 130 from losing track of the object or tracking an incorrect object. For example, the object may be at least partially occluded in a particular image of the sequence of images 140. Because the object is at least partially occluded, the second tracking system 130 may incorrectly track a different object or may lose track of the object. When the object is no longer occluded in a subsequent image, the second tracking system 130 may not be able to reacquire the object or may continue tracking the incorrect object. However, a tracking fingerprint generated by the first tracking system 110 based on the object in the subsequent image may be sufficiently similar to one of the stored tracking fingerprints 116. Based on the similarity, the first tracking system 110 may provide an instruction as the output 160 that causes the second tracking system 130 to reacquire the object in the subsequent image. Thus, by controlling the second tracking system 130 via the output 160, the first tracking system 110 may increase object tracking accuracy of the second tracking system 130.

Although the operations of the first tracking system 110 have been described with reference to a single tracking fingerprint comparison (e.g., a comparison between the first tracking fingerprint 118 and the second tracking fingerprint 120), the description is for convenience only. The first tracking fingerprint 118 may be compared to each tracking fingerprint of the stored tracking fingerprints 116 to determine whether the first tracking system 110 provides the output 160 and/or stores the first tracking fingerprint 118. For example, the stored tracking fingerprints 116 may include multiple tracking fingerprints, and the first tracking fingerprint 118 may be compared to each of the multiple stored tracking fingerprints. At least one of the stored tracking fingerprints 116 may be an initial tracking fingerprint that is generated based on a region in a first image of the sequence of images 140 that includes the object.

In FIG. 1, components of the image processing system 102 are illustrated as functional blocks. For example, the first tracking system 110 is shown as a particular functional block that includes functional sub-blocks, such as the tracking fingerprint generation logic 112 and the comparison and output generation logic 114. The image processing system 102 and its components are illustrated as functional blocks merely for convenience of description. In various embodiments, the image processing system 102 may include hardware, software, or both, to perform functions described herein as associated with the image processing system 102 and its components. Additionally, functions described with reference to particular functional blocks or sub-blocks may instead be performed by software or hardware associated with others of the functional blocks or sub-blocks. Thus, the disclosure is not limited to the specific functional blocks illustrated or the arrangement of functions with specific hardware or software.

Components of the image processing system 102, such as the first tracking system 110 and the second tracking system 130, may be centralized (e.g., executed at a particular device) or may be decentralized (e.g., executed at a plurality of devices), and may function independently (although cooperatively) or dependently upon one another. Additionally, it is to be understood that each component of the image processing system 102 may include a processor, memory accessible to the processor, and instructions executable by the processor stored in the memory to perform the actions described herein. Alternatively or in addition, one or more of the components of the image processing system 102 may include hardware (such as an application specific integrated circuit and/or digital logic) configured to execute some or all of the functions of the components.

Figure 2:
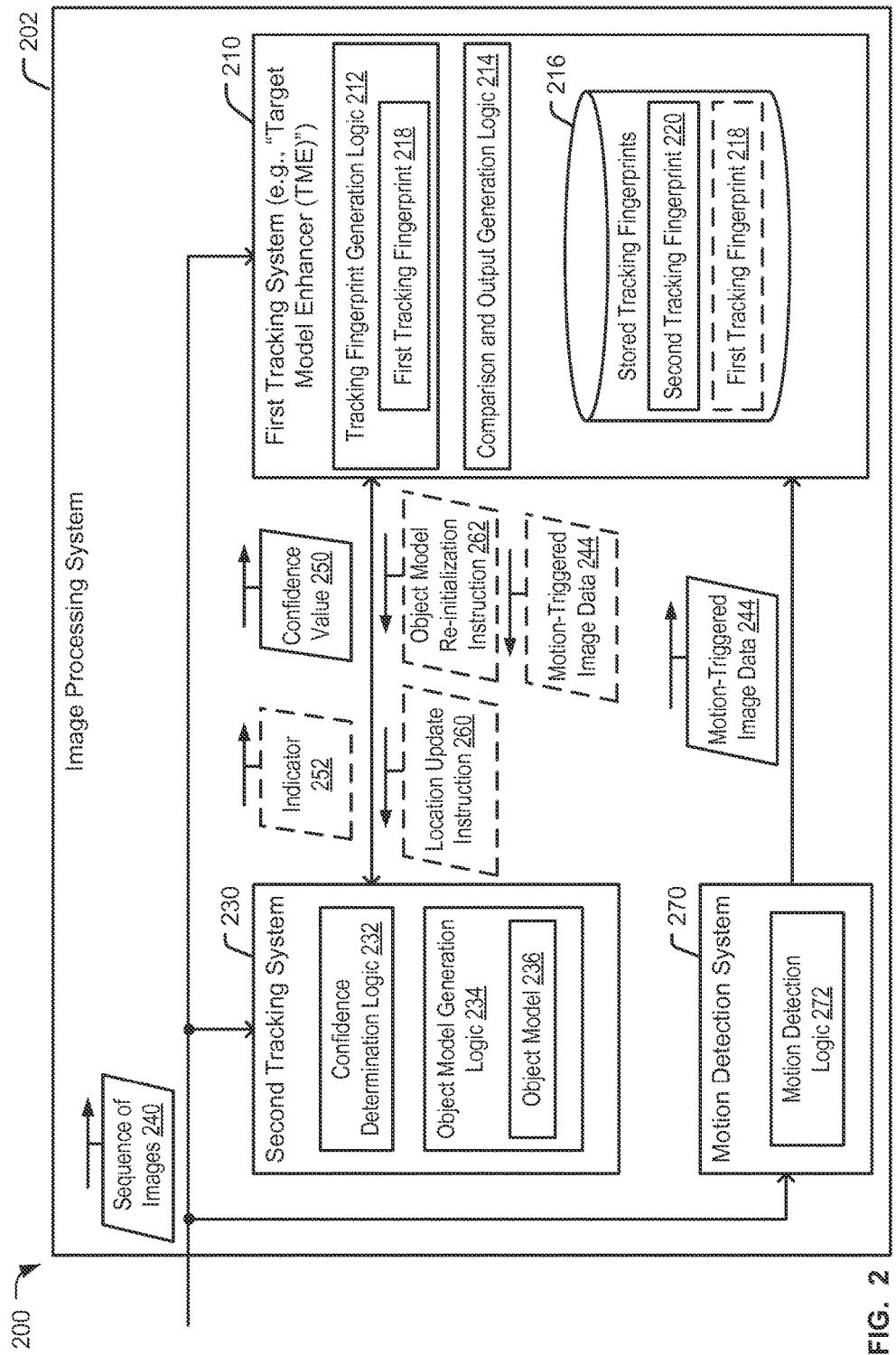
FIG. 2 is a diagram of a first particular embodiment of the image processing system of FIG. 1.

FIG. 2 illustrates a first particular embodiment of the system 100 of FIG. 1 and is generally designated 200. The system 200 includes an image processing system 202, which may include or correspond to the image processing system 102 of FIG. 1. As illustrated in FIG. 2, the image processing system 202 receives a sequence of images 240 from an image (or video) capture device, such as the image (or video) capture device 104 of FIG. 1, which is not shown for convenience of illustration. The image processing system 202 includes a first tracking system 210 (e.g., a TME system) and a second tracking system 230. The first tracking system 210 includes tracking fingerprint generation logic 212, comparison and output generation logic 214, and stored tracking fingerprints 216. The second tracking system 230 includes confidence determination logic 232 and object model generation logic 234. The first tracking system 210 and the second tracking system 230, and components thereof, may include or correspond to the first tracking system 110 and the second tracking system 130 of FIG. 1, respectively.

The image processing system 202 also includes a motion detection system 270. The motion detection system 270 may be configured to detect motion in the sequence of images and to generate motion-triggered image data 244 that represents a region in an image in which motion is detected. For example, the motion detection system 270 may include motion detection logic 272 configured to detect motion in each image, or in a subset of images, of the sequence of images 240. Regions in images that include motion may be referred to as "motion blobs." When the motion detection system 270 detects a single indication of motion (e.g., a single motion blob), the motion-triggered image data 244 represents a single region of the image. When the motion detection system 270 detects motion in multiple regions of the image (e.g., multiple motion blobs), the motion-triggered image data 244 represents multiple regions of the image, and multiple tracking fingerprints are generated based on the motion-triggered image data 244.

In a particular embodiment, the motion detection logic 272 is configured to compare an image and a previous image in the sequence of images 240 to detect motion in the image. Detecting the motion in the image may include identifying "local motion" and "global motion" in the image. Global motion refers to overall motion of the image, such as motion of background features in the image relative to the background features in the previous image. Local motion differs from global motion and refers to motion of foreground features, such as moving objects in the image relative to the moving objects in the previous image. The motion detection logic 272 may be configured to subtract global motion identified in the image from local motion identified in the image to generate a motion image. The motion image may include a set of "motion profiles." As used herein, motion profiles refer to a portion of a motion image that represents local motion in the motion image.

The motion detection logic 272 may be configured to segment the motion image into multiple segments that each include one or more pixels having a similar visual characteristic (e.g., a color, an intensity value, a texture, etc.). The motion detection logic 272 may group segments together that have a same motion profile to form a set of "master segments" representing a common moving object in the image. The motion detection logic 272 may determine a region in the image that includes the motion represented by the set of master segments and may generate the motion-triggered image data 244 representing the region in the image that includes the motion. In other embodiments, the motion detection system 270 (and the motion detection logic 272) detects motion and generates the motion-triggered image data 244 based on other motion detection algorithms or processes.

In a particular embodiment, the motion detection system 270 may be configured to provide ego-motion compensation when processing the sequence of images 240. For example, the motion detection system 270 may perform image registration by perspective transformation to provide the ego-motion compensation. The perspective transformation may be estimated based on a homography estimation between multiple point features in the image and multiple corresponding point features in a previous image. Based on the homography estimation, each image of the sequence of images 240 may be transformed to a reference plane to eliminate or to reduce (e.g., to compensate for) ego-motion.

After detecting the motion and generating the motion-triggered image data 244, the motion detection system 270 may provide the motion-triggered image data 244 to the first tracking system 210. In a particular embodiment, the motion detection system 270 provides the motion-triggered image data 244 for each image of the sequence of images 240 in which motion is detected. In another particular embodiment, the motion detection system 270 provides the motion-triggered image data 244 for a subset of images of the sequence of images 240 (e.g., once every x images, where x is an integer greater than one).

During operation, the image processing system 202 may receive the sequence of images 240 (e.g., from the motion (or video) capture device 104 of FIG. 1). The motion detection system 270 may detect motion in a region of an image and may provide the motion-triggered image data 244 to the first tracking system 210. The motion-triggered image data 244 may represent the region in the image in which the motion is detected.

The first tracking system 210 may receive the motion-triggered image data 244 from the motion detection system 270 and may receive a confidence value 250 from the second tracking system 230. The confidence value 250 may indicate a likelihood that the object is being correctly tracked by the second tracking system 230. The tracking fingerprint generation logic 212 of the first tracking system 210 may generate a first tracking fingerprint 218 based on the motion-triggered image data 244. The first tracking fingerprint 218 may be generated as described with reference to FIG. 1. After generation of the first tracking fingerprint 218, the comparison and output generation logic 214 may retrieve a second tracking fingerprint 220 from the stored tracking fingerprints 216 and may compare the first tracking fingerprint 218 and the second tracking fingerprint 220.

The first tracking system 210 may also compare the confidence value 250 to a confidence threshold, and the first tracking system 210 may determine whether the second tracking system 230 has lost track of the object. In a particular embodiment, the first tracking system 210 receives an indicator 252 from the second tracking system 230. The indicator 252 may indicate whether the second tracking system 230 has lost track of the object. In another particular embodiment, the first tracking system 210 determines whether the second tracking system 230 has lost track of the object based on the confidence value 250. For example, when the confidence value 250 is zero, or less than a second confidence threshold that is significantly less than the confidence threshold, the first tracking system 210 may determine that the second tracking system 230 has lost track of the object.

Based on a result of the comparison of the difference to one or more threshold values, based on a result of comparison of the confidence value 250 to the confidence threshold, and based on the determination whether the second tracking device 230 has lost track of the object, the first tracking system 210 may select or generate an instruction to be provided to the second tracking system 230. To illustrate, when a difference between the first tracking fingerprint 218 and the second tracking fingerprint 220 is less than a first threshold value, when the confidence value 250 is less than the confidence threshold, and based on a determination that the second tracking system 230 has not lost track of the object, the first tracking system 210 may generate and provide a location update instruction 260 and the motion-triggered image data 244 to the second tracking system 230. In this case, a likelihood that the second tracking system 230 is correctly tracking the object may be low (as indicated by the confidence value being less than the confidence threshold), and the first tracking system 210 may provide the location update instruction 260 to override the second tracking system 230 when a tracking fingerprint generated from the motion-triggered image data 244 is sufficiently similar to one of the stored tracking fingerprints 216 (e.g., when the difference is less than the first threshold value).

Alternatively, when the second tracking system 230 has lost track of the object, the first tracking system 210 may determine whether the difference between the first tracking fingerprint 218 and the second tracking fingerprint 220 is less than a second threshold value. When the difference is less than the second threshold value, the first tracking system 210 may generate and provide an object model re-initialization instruction 262 and the motion-triggered image data 244 to the second tracking system 230. In this case, the second tracking system 230 may not be able to reacquire the object in a subsequent image without assistance from the first tracking system 210. Selecting the second threshold value to be less than the first threshold value may cause the object model re-initialization instruction 262 to be generated in situations when there is a high likelihood that the first tracking system 210 has correctly identified the motion-triggered image data 244 as representing the object, which may reduce a likelihood that the first tracking system 210 provides the object model re-initialization instruction 262 based on incorrect image data.

When the second tracking system 230 receives the location update instruction 260 and the motion-triggered image data 244, the second tracking system 230 may output other location data corresponding to the motion-triggered image data 244 instead of location data generated by the second tracking system 230. In a particular embodiment, the motion-triggered image data 244 includes the other location data that indicates a location of the region in the image. In another particular embodiment, the second tracking system 230 determines the other location data by determining a location of the region in the image. By outputting the other location data instead of the location data generated without assistance from the first tracking system 210 (e.g., location data associated with a small confidence value 250), the second tracking system 230 may output location data that has a higher likelihood of being correct.

When the second tracking system 230 receives the object model re-initialization instruction 262 and the motion-triggered image data 244, the second tracking system 230 may modify the object model 236 based on the motion-triggered image data 244. For example, in response to receiving the object model re-initialization instruction 262, the object model generation logic 234 may modify (e.g., "re-initialize") the object model 236 so that the object model 236 represents the object in the region of the image represented by the motion-triggered image data 244. After modifying the object model 236 (e.g., data used by the second tracking system 230 to represent the object and to track the object in the sequence of images 240), the second tracking system 230 may use the modified object model 236 to track the object in subsequent images of the sequence of images 240. Because the object model 236 is modified based on image data that the first tracking system 210 determined to be representative of the object (e.g., based on a comparison of tracking fingerprints), the second tracking system 230 may be able to reacquire the object and to continue tracking the object in subsequent images.

In addition to generating instructions for the second tracking system 230, the comparison and output generation logic 214 may determine whether to store the first tracking fingerprint 218 as one of the stored tracking fingerprints 216. For example, based on the result of the comparison (e.g., when the difference between the first tracking fingerprint 218 and the second tracking fingerprint 220 is less than a third threshold value the first tracking system 210 may store the first tracking fingerprint 218 as one of the stored tracking fingerprints 216. Storing the first tracking fingerprint 218 may represent a determination that the first tracking fingerprint 218 represents the object after changes to one or more characteristics. Alternatively, when the difference is greater than or equal to the third threshold value, the first tracking fingerprint 218 is not stored.

Because multiple tracking fingerprints are stored (as the stored tracking fingerprints 216), the first tracking system 210 may be able to recognize the object as one or more characteristics change. For example, an initial tracking fingerprint may represent the object in an initial image of the sequence of images 240. In a subsequent image, a particular tracking fingerprint may be generated based on motion-triggered image data. If the difference between the particular tracking fingerprint and the initial tracking fingerprint is too great, the first tracking system 210 may no longer recognize the object. However, if multiple tracking fingerprints are stored based on motion-triggered image data of images between the initial image and the subsequent image, the particular tracking fingerprint may be sufficiently similar to one of the multiple tracking fingerprints, such that the first tracking system 210 may be able to recognize the object in the subsequent image and provide an appropriate instruction to the second tracking system 230 to cause the second tracking system 230 to correctly track the object in subsequent images.

Additionally, the first tracking system 210 may enable the second tracking system 230 to reacquire the object after the object becomes at least partially occluded in a particular image. For example, in the particular image, the object may be at least partially occluded (e.g., the object may be a car and the car may be at least partially covered by a tunnel). Because the object is at least partially occluded, the second tracking system 230 may lose track of the object or may track an incorrect object. In a subsequent image, the object may no longer be occluded (e.g., the car may exit the tunnel), and the motion detection system 270 may detect the motion of the object. The first tracking system may receive the motion-triggered image data 244 that represents the object in the subsequent image. Based on a comparison of tracking fingerprints, the first tracking system 210 may recognize the object and may provide an appropriate instruction to the second tracking system 230 to cause the second tracking system 230 to correctly track the object in subsequent images.

Figure 3:
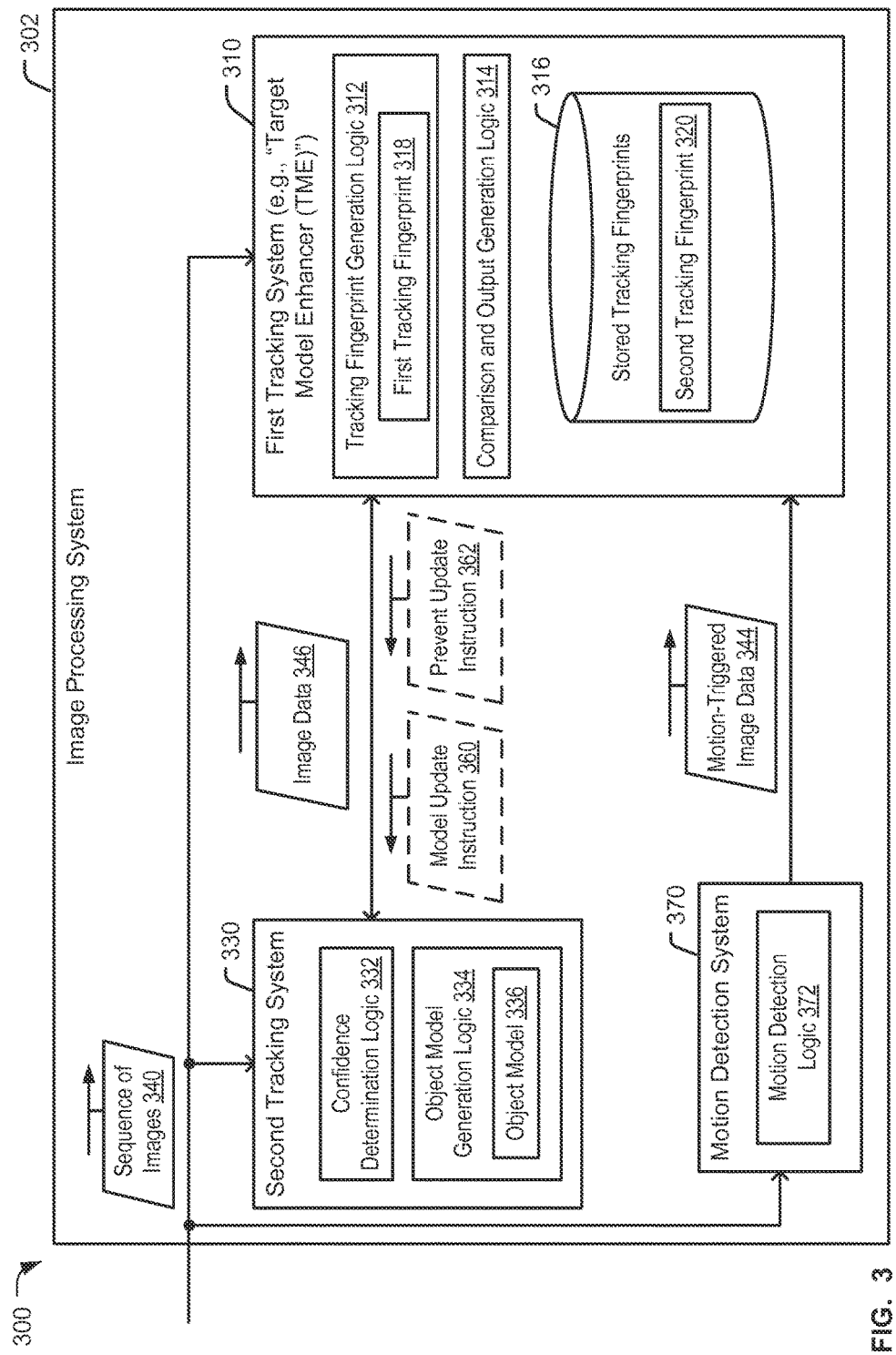
FIG. 3 is a diagram of a second particular embodiment of the image processing system of FIG. 1.

FIG. 3 illustrates a second particular embodiment of the system 100 of FIG. 1 and is generally designated 300. The system 300 includes an image processing system 302, which may include or correspond to the image processing system 102 of FIG. 1. As illustrated in FIG. 3, the image processing system 302 receives a sequence of images 340 from an image (or video) capture device, such as the image (or video) capture device 104 of FIG. 1, which is not shown for convenience of illustration. The image processing system 302 includes a first tracking system 310 (e.g., a TME) system and a second tracking system 330. The first tracking system 310 includes tracking fingerprint generation logic 312, comparison and output generation logic 314, and stored tracking fingerprints 316. The second tracking system 330 includes confidence determination logic 332 and object model generation logic 334. The first tracking system 310 and the second tracking system 330, and components thereof, may include or correspond to the first tracking system 110 and the second tracking system 130, respectively, of FIG. 1. Additionally, the image processing system 302 may include a motion detection system 370 that includes motion detection logic 372, which may include or correspond to the motion detection system 270 and the motion detection logic 272, respectively, of FIG. 2.

During operation, the second tracking system 330 may determine to modify an object model 336 based on an image of the sequence of images 340. For example, the second tracking system 330 may be an adaptive tracking system and the object model generation logic 334 may determine to modify the object model 336 based on image data 346. The object model 336 may be modified based on an object in a region of an image represented by the image data 346. However, prior to modifying the object model 336, the second tracking system may provide the image data 346 to the first tracking system 310.

After receiving the image data 346 at the first tracking system 310, the tracking fingerprint generation logic 312 may generate a first tracking fingerprint 318 based on the image data 346. The comparison and output generation logic 314 may compare the first tracking fingerprint 318 to a second tracking fingerprint 320 of the stored tracking fingerprints 316. The stored tracking fingerprints 316 may include an initial tracking fingerprint and one or more tracking fingerprints generated based on motion-triggered image data 344, as described with reference to FIG. 2. The comparison may include determining a difference between the first tracking fingerprint 318 and the second tracking fingerprint 320. Although a comparison to a single stored tracking fingerprint (e.g., the second tracking fingerprint 320) is described, in some embodiments the first tracking fingerprint 318 may be compared to each of the stored tracking fingerprints 316.

When the difference is less than a fourth threshold value (e.g., a model update threshold value), the comparison and output generation logic 314 may generate a model update instruction 360. The first tracking system 310 may provide the model update instruction 360 to the second tracking system 330. When the difference is greater than or equal to the fourth threshold value, the comparison and output generation logic 314 may generate a prevent update instruction 362. The first tracking system 310 may provide the prevent update instruction 362 to the second tracking system 330. The fourth threshold value may be selected based on a target tracking fingerprint similarity to enable modification of the object model 336. For example, a larger value of the fourth threshold value may enable more modifications to the object model 336 but may also increase a likelihood that the modification to the object model 336 is incorrect, while a smaller value of the fourth threshold value may cause the object model 336 to be modified less often but with a higher likelihood that the modification is correct.

The second tracking system 330 system may modify the object model 336 based on the image data 346 in response to receiving the model update instruction 360. For example, in response to receiving the model update instruction 360, the object model generation logic 334 may modify the object model 336 so that the object model 336 represents the object in the region of the image represented by the image data 346. Modification of the object model 336 may be performed in accordance with the tracking algorithm or methodology used by the second tracking system 330. After modifying the object model 336, the second tracking system 330 may use the modified object model 336 to track the object in subsequent images of the sequence of images 340.

The second tracking system 330 may avoid modification of the object model 336 in response to receiving the prevent update instruction 362. For example, in response to receiving the prevent update instruction 362, the second tracking system 330 may determine that the image data 346 does not represent the object and the object model generation logic 334 may avoid modification of the object model 336 based on the image data 346. Accordingly, the second tracking system 330 may continue to use the object model 336 without modification to track the object in subsequent images of the sequence of images 340. Thus, by providing either the model update instruction 360 or the prevent update instruction 362 based on a result of the comparison between the first tracking fingerprint 318 and the second tracking fingerprint 320, the first tracking system 310 may perform a determination whether the object model 336 is being modified based on correct information (e.g., image data representing the object with one or more characteristics that have changes as compared to the object model 336) or incorrect information (e.g., different objects).

Figure 4:
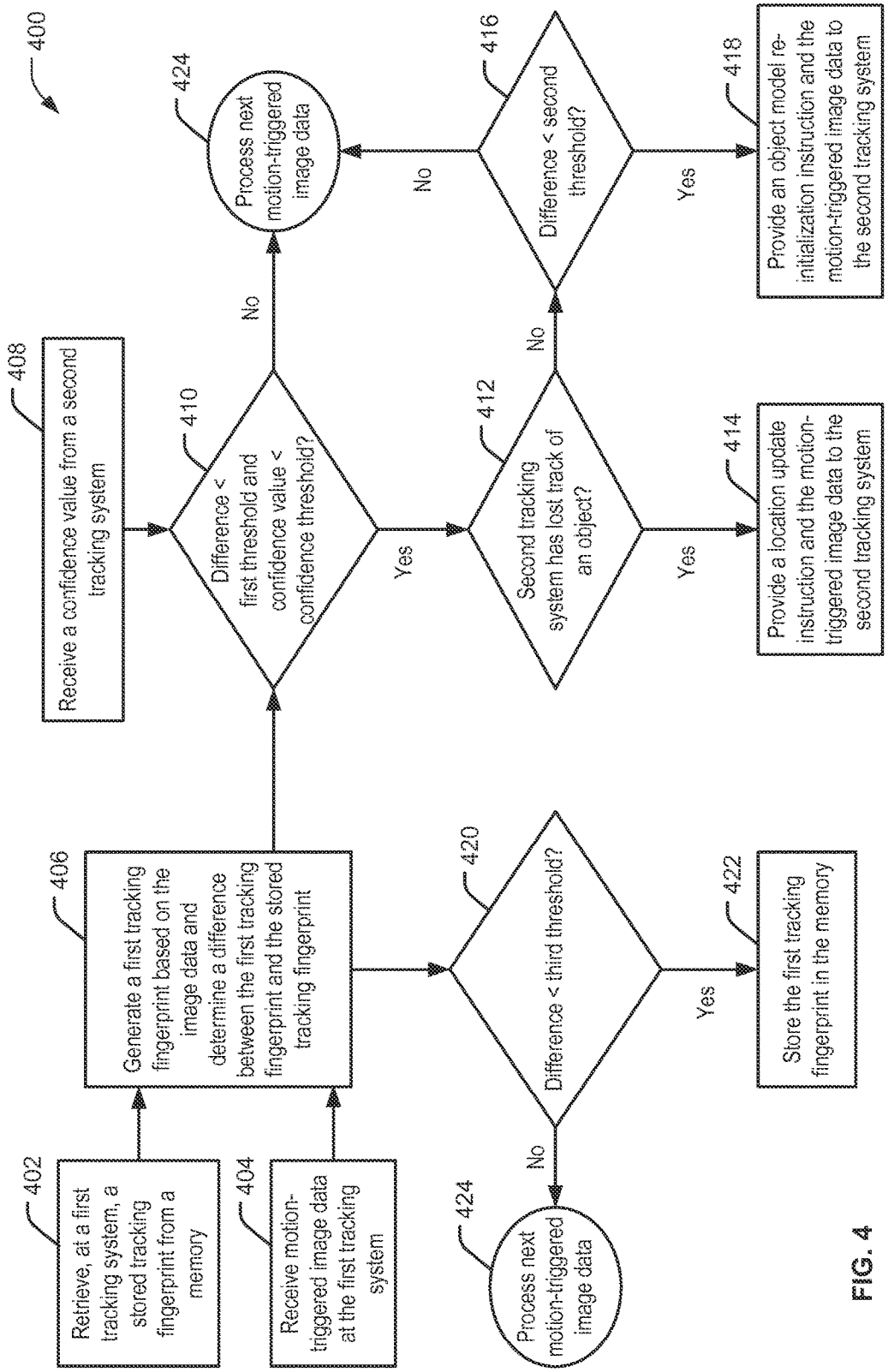
FIG. 4 is a flow chart of a particular embodiment of a method of providing an output from a first tracking system to a second tracking system based on a tracking fingerprint generated from motion-triggered image data received from a motion detection system.

FIG. 4 illustrates a flow chart of a particular embodiment of a method of providing an output from a first tracking system to a second tracking system based on a comparison of a tracking fingerprint generated based on image data received from a motion detection system to one or more stored tracking fingerprints. In a particular embodiment, the method 400 may be performed at the first tracking system 210 of FIG. 2.

The method 400 includes retrieving, at a first tracking system, a stored tracking fingerprint from a memory, at 402, and receiving motion-triggered image data at the first tracking system, at 404. For example, with reference to FIG. 2, the first tracking system 210 may receive the motion-triggered image data 244 from the motion detection system 270.

The method 400 includes generating a first tracking fingerprint based on the motion-triggered image data and determining a difference between the first tracking fingerprint and the stored tracking fingerprint, at 406. For example, the first tracking fingerprint may be generated based on feature data extracted from the motion-triggered image data and one or more mathematical models, as described with reference to FIG. 1. The difference may be a Kullback-Leibler divergence value between the first tracking fingerprint and the stored tracking fingerprint. After determining the difference, the method 400 continues to steps 410 and 420. Although a comparison of the first tracking fingerprint to a single stored tracking fingerprint is described, the first tracking fingerprint may be compared to each of multiple stored tracking fingerprints, and multiple differences may be determined.

Prior to step 410, the method 400 includes receiving a confidence value from a second tracking system, at 408. The confidence value may indicate a likelihood that the second tracking system is correctly tracking the object. The method 400 includes determining whether the difference between the first tracking fingerprint and the stored tracking fingerprint is less than a first threshold value (e.g., a location update threshold value) and determining whether the confidence value is less than a confidence threshold, at 410. For example, the first tracking system determines whether the difference is less than the first threshold value, and when the difference is less than the first threshold value, the first tracking system determines whether the confidence value is less than the confidence threshold. When the confidence value is greater than or equal to the confidence threshold or when the difference is greater than or equal to the first threshold value, the method 400 continues to 424, where next motion-triggered image data is processed.

The method 400 includes determining whether the second tracking system has lost track of an object, at 412. The determination whether the second tracking system has lost track of the object may be based on an indicator or based on the confidence value, as described with reference to FIG. 2. When the first tracking system determines that the second tracking system has not lost track of the object, the method 400 continues to 414, which includes providing a location update instruction and the motion-triggered image data to the second tracking system. The second tracking system may output other location data determined based on the motion-triggered image data instead of location data generated at the second tracking system in response to receiving the location update instruction.

When the first tracking system determines that the second tracking system has lost track of the object, the method 400 continues to 416, which includes determining whether the difference between the first tracking fingerprint and the stored tracking fingerprint is less than a second threshold value (e.g., a re-initialization threshold value). When the difference is less than the second threshold value, the method 400 continues to 418, which includes providing an object model re-initialization instruction and the motion triggered image data to the second tracking system. The second tracking system may modify an object model based on the motion-triggered image data in response to receiving the object model re-initialization instruction. When the difference is greater than or equal to the second threshold value, the method 400 continues to 424, which includes processing next motion-triggered image data.

Additionally, the method 400 includes determining whether the difference is less than a third threshold value (e.g., a tracking fingerprint update threshold value), at 420. When the difference is less than the third threshold value, the method 400 continues to 422, which includes storing the first tracking fingerprint in the memory. For example, based on the difference being less than the third threshold value, the first tracking system may determine that the first tracking fingerprint represents the object after undergoing a change to one or more characteristics, and the first tracking system may store the first tracking fingerprint with the other stored tracking fingerprints. In a particular embodiment, the first tracking fingerprint is not stored when the first tracking fingerprint and the stored tracking fingerprint are substantially equal (e.g., the difference is zero) to prevent storing redundant copies of the same tracking fingerprints. When the difference is greater than or equal to the threshold, the method 400 continues to 424, which includes processing the next image data.

Figure 5:
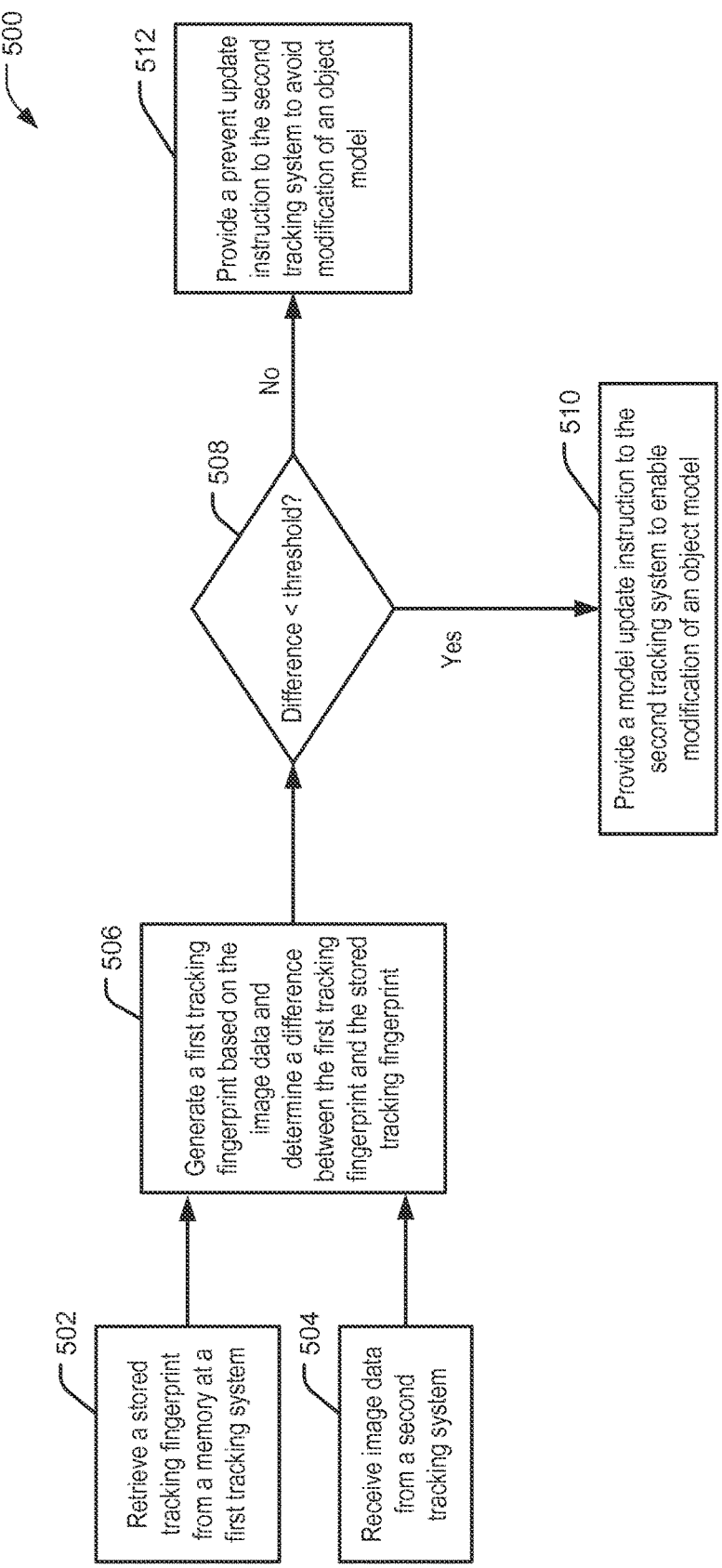
FIG. 5 is a flow chart of a particular embodiment of a method of providing an output from a first tracking system to a second tracking system based on a tracking fingerprint generated from image data received from the second tracking system.

FIG. 5 illustrates a flow chart of a particular embodiment of a method of providing an output from a first tracking system to a second tracking system based on a comparison of a stored tracking fingerprint to a tracking fingerprint generated based on image data received from the second tracking system. In a particular embodiment, the method 500 may be performed at the first tracking system 310 of FIG. 3.

The method 500 includes retrieving a stored tracking fingerprint from a memory at a first tracking system, at 502. The tracking fingerprints may be stored to enable the first tracking system to track an object in a sequence of images. The method 500 includes receiving image data from a second tracking system at the first tracking system, at 504. For example, the second tracking system may determine to modify an object model based on a region of an image of the sequence of images represented by the image data. Prior to performing modifying the object model, the second tracking system may provide the image data to the first tracking system to enable the first tracking system to verify, based on results of one or more tracking fingerprint comparisons, whether the object model should be modified.

The method 500 includes generating a first tracking fingerprint based on the image data and determining a difference between the first tracking fingerprint and the stored tracking fingerprint, at 506. For example, the first tracking fingerprint may be generated by extracting feature data from the image data and fitting the extracted feature data to a mathematical model, as described with reference to FIG. 1. The difference between the first tracking fingerprint and the stored tracking fingerprint may be a distance measurement between the first tracking fingerprint and the stored tracking fingerprint. In a particular embodiment, the difference is a Kullback-Leibler divergence value. Although a comparison of the first tracking fingerprint to a single stored tracking fingerprint is described, the first tracking fingerprint may be compared to each of multiple stored tracking fingerprints, and multiple differences may be determined.

The method 500 includes determining whether the difference is less than a fourth threshold value, at 508. For example, the first tracking system may determine whether the difference is less than the fourth threshold value (e.g., a model update threshold value). In a particular embodiment, the fourth threshold value may be the same as the second threshold value described with reference to FIGS. 2 and 4. In other embodiments, the fourth threshold value may be different that the first threshold value, the second threshold value, and the third threshold value described with reference to FIGS. 2 and 4.

When the difference is less than the fourth threshold value, the method 500 continues to 510, which includes providing a model update instruction to the second tracking system to enable the modification the object model. For example, when the difference is less than the fourth threshold value, the first tracking system may provide the model update instruction to the second tracking system. The second tracking system may enable (e.g., allow) the object model to be modified based on the image data in response to receiving the model update instruction. When the difference is greater than or equal to the fourth threshold, the method 500 continues to 512, which includes providing a prevent update instruction to the second tracking system to avoid modification of the object model. For example, when the difference is less than the fourth threshold value, the first tracking system may provide the prevent update instruction to the second tracking system. The second tracking system may avoid modifying the object model in response to receiving the prevent update instruction. In this manner, the first tracking system may compare a tracking fingerprint generated based on the image data to stored tracking fingerprints to verify whether the second tracking system should modify the object model.

Figure 6:
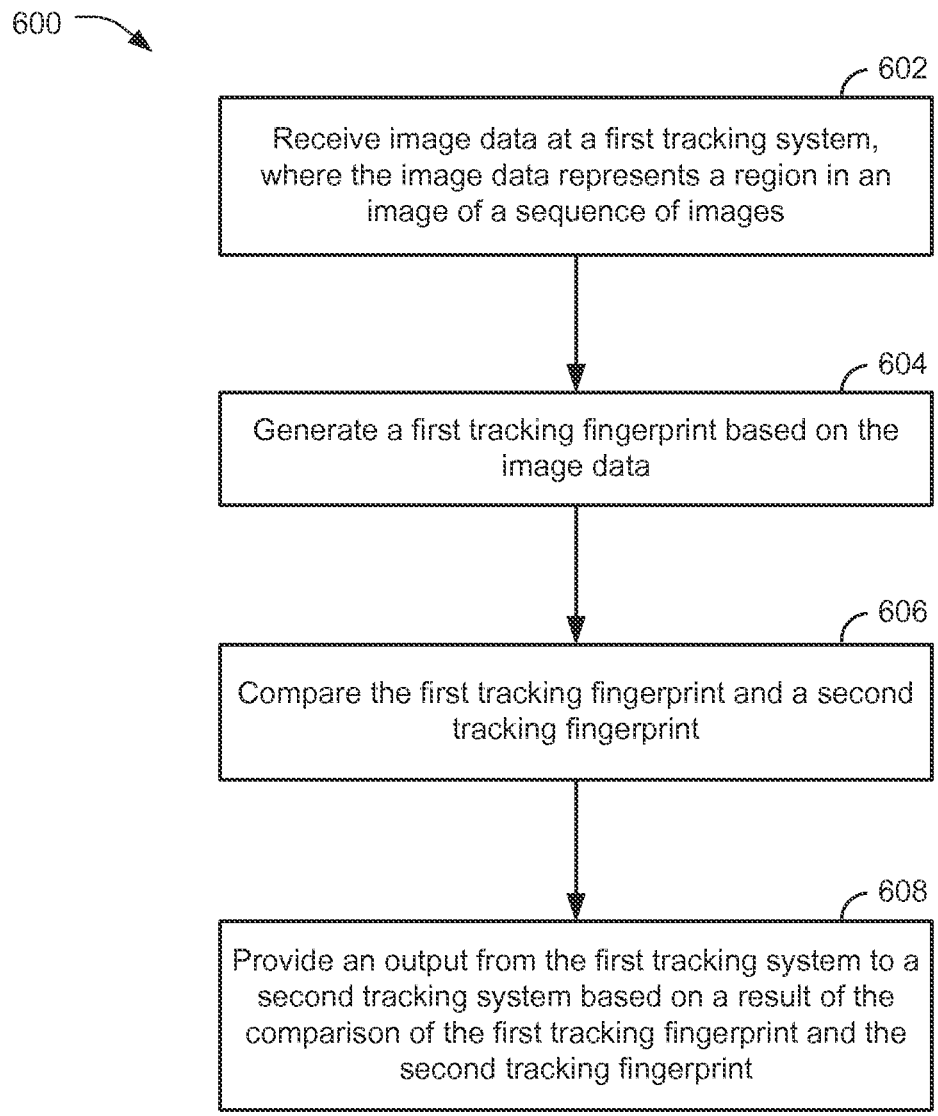
FIG. 6 is a flow chart of a particular embodiment of a method of providing an output from a first tracking system to a second tracking system.

FIG. 6 illustrates a flow chart of a particular embodiment of a method of providing an output from a first tracking system to a second tracking system based on a comparison of tracking fingerprints. In a particular embodiment, the method 600 may be performed at the first tracking system 110 of FIG. 1, the first tracking system 210 of FIG. 2, or the first tracking system 310 of FIG. 3.

The method 600 includes receiving image data at a first tracking system, at 602. The image data may represent a region in an image of a sequence of images. For example, with reference to FIG. 1, the first tracking system 110 receives the image data 144, which represents a region of an image in the sequence of images 140.

The method 600 includes generating a first tracking fingerprint based on the image data, at 604. For example, with reference to FIG. 1, the first tracking system 110 generates the first tracking fingerprint 118 based on the image data 144. In a particular embodiment, the first tracking fingerprint includes data representing a mathematical model that is generated based on feature data extracted from the image data.

The method 600 includes comparing the first tracking fingerprint and a second tracking fingerprint, at 606. For example, with reference to FIG. 1, the first tracking system 110 compares the first tracking fingerprint 118 to the second tracking fingerprint 120 of the stored tracking fingerprints 116. In a particular embodiment, comparing the first tracking fingerprint and the second tracking fingerprint includes determining a difference between the first tracking fingerprint and the second tracking fingerprint based on a distance measurement between the first tracking fingerprint and the second tracking fingerprint. For example, the difference may be determined based on a Kullback-Leibler divergence value.

The method 600 includes providing an output from the first tracking system to a second tracking system based on a result of the comparison of the first tracking fingerprint and the second tracking fingerprint, at 608. For example, with reference to FIG. 1, the first tracking system 110 provides the output 160 to the second tracking system 130 based on a result of the comparison of the first tracking fingerprint 118 and the second tracking fingerprint 120. In a particular embodiment, the second tracking system is configured to track an object in the sequence of images based on an object model and to modify the object model, or to prevent a modification to the object model, based on the output from the first tracking system. The object model may generated by the second tracking system based on data representing the object in a first image of the sequence of images. For example, with reference to FIG. 1, the second tracking system 130 may be configured to track the object in the sequence of images 140 and to modify an object model, such as the object model 236 of FIG. 2 and/or the object model 336 of FIG. 3, or to prevent a modification to the object model, based on the output 160.

In a particular embodiment, the image data is motion-triggered image data received from a motion detector (e.g., the motion-triggered image data 244 received from the motion detection system 270 of FIG. 2). In this embodiment, the output includes the motion-triggered image data and one of a location update instruction (e.g., the location update instruction 260 of FIG. 2) and an object model re-initialization (e.g., the object model re-initialization instruction 262 of FIG. 2). The instruction to be included in the output is selected based on a result of a comparison of the first tracking fingerprint to the second tracking fingerprint and based on a result of a comparison of a confidence value to a confidence threshold, as described with reference to FIGS. 2 and 4. In another particular embodiment, the image data is received from the second tracking system. In this embodiment, the output includes one of a model update instruction (e.g., the model update instruction 360 of FIG. 3) and a prevent update instruction (e.g., the prevent update instruction 362 of FIG. 3). The instruction to be included in the output is selected based on a result of a comparison of the first tracking fingerprint to the second tracking fingerprint, as described with reference to FIGS. 3 and 5.

The methods 400, 500, and 600 of FIGS. 4, 5, and 6 respectively may be initiated or controlled by a processing unit, such as a central processing unit (CPU), a digital signal processor (DSP), a controller, an application-specific integrated circuit (ASIC), a field-programmable gate array (FPGA) device, another hardware device, a firmware device, or any combination thereof. As an example, the method 500 of FIG. 5 may be initiated or controlled by one or more processors executing code (e.g., instructions stored in a memory device).

Figure 7:
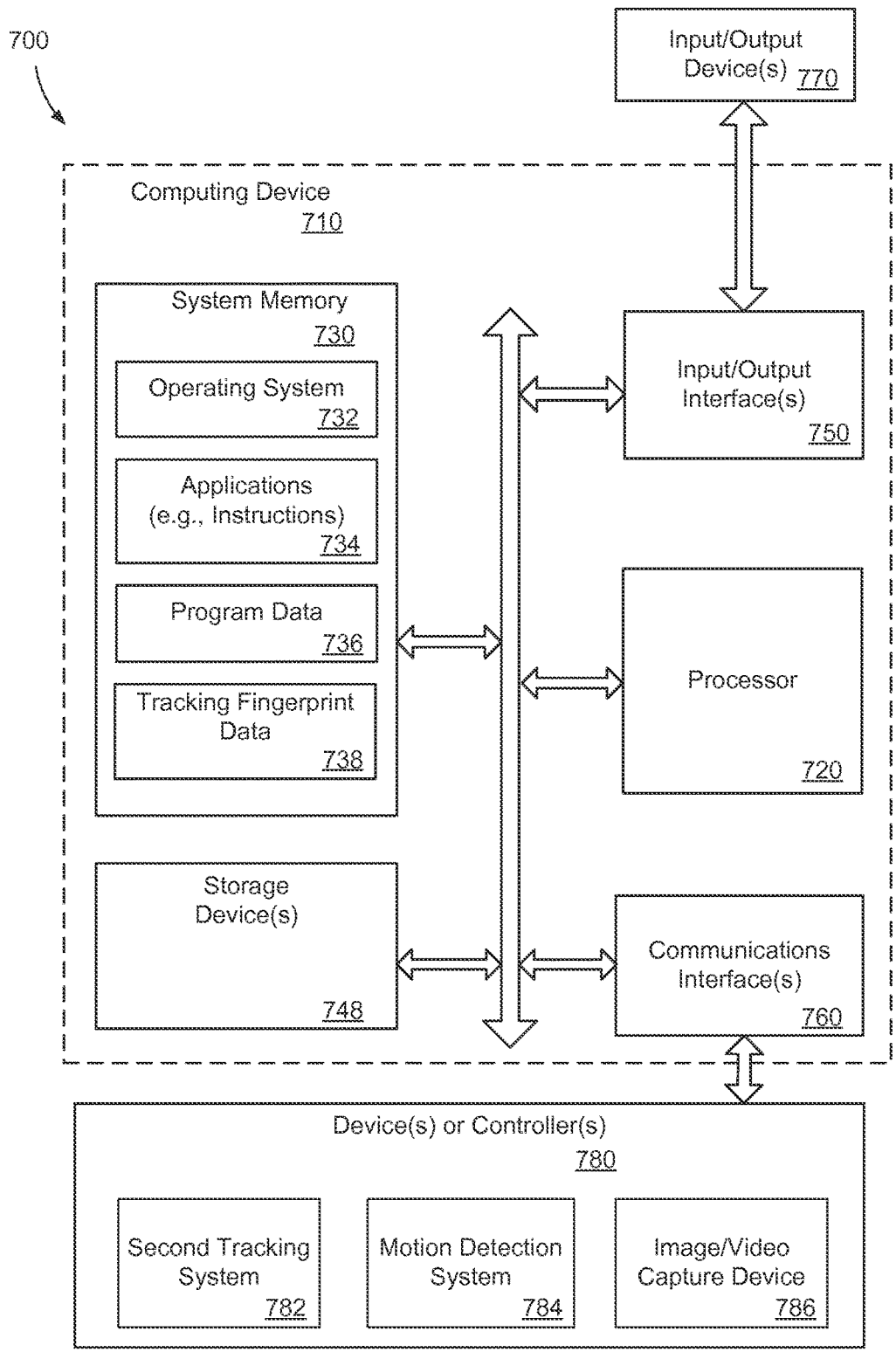
FIG. 7 is a block diagram that illustrates a particular embodiment of a computing system (e.g., a first tracking system) operable to provide an output to a second tracking system.

FIG. 7 is a block diagram of a computing environment 700 including a computing device 710 operable to provide an output to a tracking system based on a comparison of tracking fingerprints. For example, the computing device 710 may be included within or correspond to the image processing system 102 of FIG. 1, the image processing system 202 of FIG. 2, the image processing system 302 of FIG. 3, or a combination thereof. In a particular embodiment, the computing device 710 corresponds to the first tracking system 110 of FIG. 1, the first tracking system 210 of FIG. 2, the first tracking system 310 of FIG. 3, or a combination thereof, and the computing device 710 provides an output to a second tracking system 782.

The computing device 710 may include at least one processor 720. Within the computing device 710, the at least one processor 720 may communicate with a system memory 730, one or more storage devices 748, one or more input/output interfaces 750, one or more communications interfaces 760, or a combination thereof.

The system memory 730 may include volatile memory devices (e.g., random access memory (RAM) devices), nonvolatile memory devices (e.g., read-only memory (ROM) devices, programmable read-only memory, and flash memory), or both. The system memory 730 may include an operating system 732, which may include a basic input/output system for booting the computing device 710 as well as a full operating system to enable the computing device 710 to interact with users, other programs, and other devices. The system memory 730 may also include one or more applications (e.g., instructions) 734, program data 736, and tracking fingerprint data 738. The program data 736 may include data used by the applications 734 to perform respective functions of the applications 734. The applications 734 may include instructions executable by the at least one processor 720 to control a first tracking system based on image data. For example, the at least one processor 720 may generate a first tracking fingerprint based on image data and may compare the first tracking fingerprint to a stored tracking fingerprint of the fingerprint data 738. Based on a result of the comparison, the at least one processor may provide an output to the second tracking system 782.

The one or more storage devices 748 may include nonvolatile storage devices, such as magnetic disks, optical disks, or flash memory devices. The storage devices 748 may include both removable and non-removable memory devices. In a particular embodiment, the storage devices 748 may be configured to store the operating system 732, the applications 734, the program data 736, the tracking fingerprint data 738, or a combination thereof. The system memory 730 and the storage devices 748 may include tangible, non-transitory computer readable media devices that are physical devices and are not a signal.

In a particular embodiment, the at least one processor 720 is configured to execute computer executable instructions, such as the applications 734, stored at the system memory 730. The instructions may be executable to cause the at least one processor 720 to perform operations. The operations may include receiving image data. The image data may represent a region in an image of a sequence of images. The operations include generating a first tracking fingerprint based on the image data. The operations include comparing the first tracking fingerprint and a second tracking fingerprint. The second tracking fingerprint may be stored as part of the tracking fingerprint data 738 at the storage device 748. The operations further include providing an output to the second tracking system 782 based on a result of the comparison of the first tracking fingerprint and the second tracking fingerprint.

The one or more input/output interfaces 750 may enable the computing device 710 to communicate with one or more input/output devices 770 to facilitate user interaction. For example, the one or more input/output interfaces 750 may be adapted to receive input from a user, to receive input from another computing device, or a combination thereof. The input/output interfaces 750 may be configured to provide the input signal to the at least one processor 720 in response to input from a user. The input/output interfaces 750 may conform to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces. The input/output devices 770 may include user interface devices and displays, including some combination of buttons, keyboards, pointing devices, displays, speakers, microphones, touch screens, and other devices. The processor 720 may detect interaction events based on user input received via the input/output interfaces 750. Additionally, the processor 720 may send a display to a display device via the input/output interfaces 750.

The one or more communications interfaces 760 may enable the computing device 710 to communicate with one or more other computing devices or controllers 780. The one or more communications interfaces 760 may include wired Ethernet interfaces, Institute of Electrical and Electronics Engineers (IEEE) 802 wireless interfaces, Bluetooth communication interfaces, electrical (or power line) interfaces, optical or radio frequency interfaces, or other wired or wireless interfaces. The other computer devices or controllers 780 may include host computers, servers, workstations, portable computers, telephones, tablet computers, or any other communication device or component. Additionally, the other computer devices or controllers 780 may include the second tracking system 782, a motion detection system 784, and an image (or video) capture device 786. The one or more communications interfaces 760 may enable the computing device 710 to communicate with the second tracking system 782, the motion detection system 784, and the image (or video) capture device 786. For example, the computing device 710 may receive a sequence of images (e.g., the sequence of images 140 of FIG. 1) from the image (or video) capture device 786 and may receive image data from the motion detection system 784 or from the second tracking system 782. Additionally, the computing device 710 may provide an output (e.g., the output 160 of FIG. 1) to the second tracking system 782 to control or modify an operation of the second tracking system 782.

Figure 8:
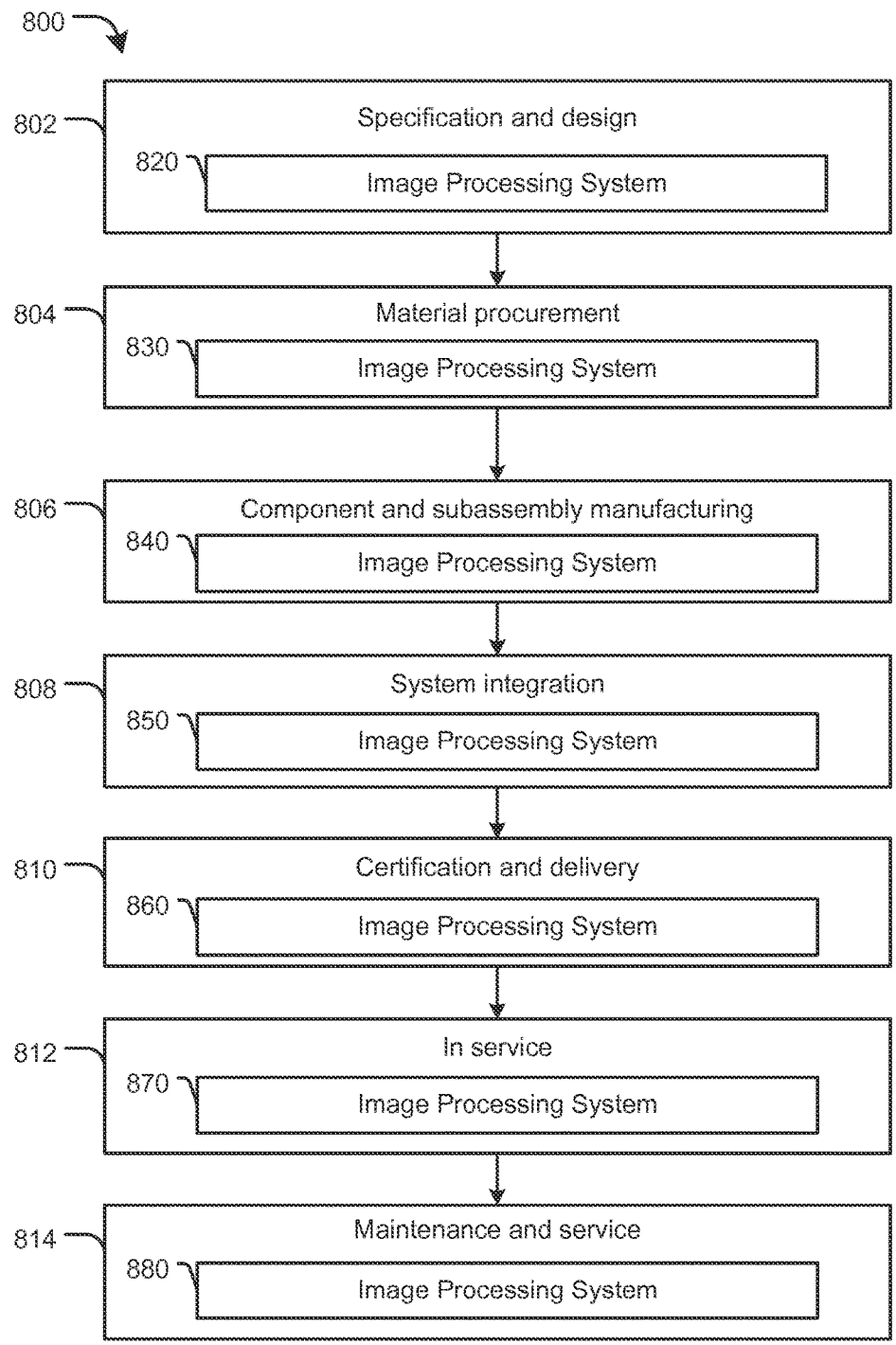
FIG. 8 is a flow chart illustrative of a life cycle of an aircraft that includes an image processing system including a first tracking system and a second tracking system.
Figure 9:
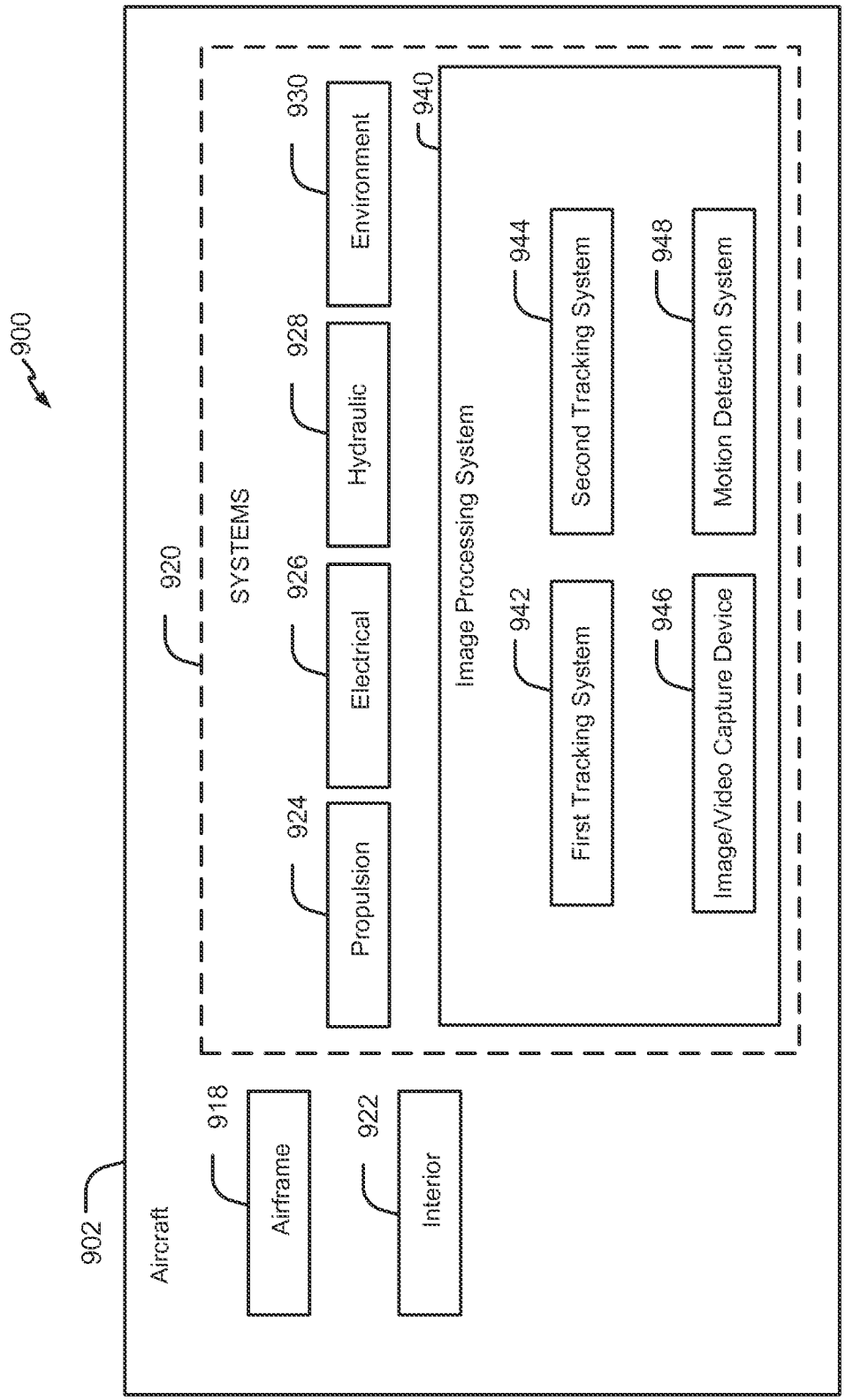
FIG. 9 is a block diagram of an illustrative embodiment of an aircraft that includes an image processing system including a first tracking system and a second tracking system.

Referring to FIGS. 8 and 9, examples of the disclosure are described in the context of a vehicle manufacturing and service method 800 as illustrated by the flow chart of FIG. 8 and a vehicle system 900 as illustrated by the block diagram of FIG. 9. A vehicle produced by the vehicle manufacturing and service method 800 of FIG. 8 and a vehicle 902 of FIG. 9 may include an aircraft, a watercraft, a land craft, a spacecraft, an autonomous vehicle, or a combination thereof.

Referring to FIG. 8, a flowchart illustrative of a life cycle of an aircraft that includes an image processing system including a first tracking system and a second tracking system is shown and designated 800. During pre-production, the exemplary method 800 includes, at 802, specification and design of an aircraft, such as the aircraft 902 described with reference to FIG. 9. During specification and design of the aircraft, the method 800 may include, at 820, specification and design of an image processing system. For example, the image processing system may include the image processing system 102 of FIG. 1, the image processing system 202 of FIG. 2, the image processing system 302 of FIG. 3, the computing device 710 of FIG. 7, or a combination thereof. At 804, the method 800 includes material procurement. At 830, the method 800 includes procuring materials for the image processing system.

During production, the method 800 includes, at 806, component and subassembly manufacturing and, at 808, system integration of the aircraft. The method 800 may include, at 840, component and subassembly manufacturing (e.g., producing the first tracking system, the second tracking system, the motion detection system, or the image and/or video capture device) of the image processing system and, at 850, system integration (e.g., coupling the second tracking system to the first tracking system, the motion detection system, and the image and/or video capture device) of the image processing system. At 810, the method 800 includes certification and delivery of the aircraft and, at 812, placing the aircraft in service. Certification and delivery may include, at 860, certifying the image processing system. At 870, the method 800 includes placing the image processing system in service. While in service by a customer, the aircraft may be scheduled for routine maintenance and service (which may also include modification, reconfiguration, refurbishment, and so on). At 814, the method 800 includes performing maintenance and service on the aircraft. At 880, the method 800 includes performing maintenance and service of the image processing system. For example, maintenance and service of the image processing system may include replacing one or more of the first tracking system, the second tracking system, the motion detection system, or the image and/or video capture device.

Each of the processes of the method 800 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Referring to FIG. 9, a block diagram of an illustrative embodiment of an aircraft that includes an image processing system including a first tracking system and a second tracking system is shown and designated 900. As shown in FIG. 9, the aircraft 902 produced by the method 800 may include an airframe 918 with a plurality of systems 920 and an interior 922. Examples of high-level systems 920 include one or more of a propulsion system 924, an electrical system 926, a hydraulic system 928, an environmental system 930, and an image processing system 940. The image processing system 940 may include or correspond to the image processing system 102 described with reference to FIG. 1, the image processing system 202 described with reference to FIG. 2, the image processing system 302 described with reference to FIG. 3, or any combination thereof, and may include a first tracking system 942, a second tracking system 944, an image and/or video capture device 946, and a motion detection system 948. The first tracking system 942 may include or correspond to the first tracking system 110 of FIG. 1, the first tracking system 210 of FIG. 2, or the first tracking system 310 of FIG. 3, the second tracking system 944 may include or correspond to the second tracking system 130 of FIG. 1, the second tracking system 230 of FIG. 2, or the second tracking system 330 of FIG. 3, the image and/or video capture device 946 may include or correspond to the image and/or video capture device 104 of FIG. 1, and the motion detection system 948 may include or correspond to the motion detection system 270 of FIG. 2. Any number of other systems may be included. Although an aerospace example is shown, the embodiments described herein may be applied to other industries, such as the automotive industry.

Apparatus and methods embodied herein may be employed during any one or more of the stages of the method 800. For example, components or subassemblies corresponding to production process 808 may be fabricated or manufactured in a manner similar to components or subassemblies produced while the aircraft 902 is in service, at 812 for example and without limitation. Also, one or more apparatus embodiments, method embodiments, or a combination thereof may be utilized during the production stages (e.g., elements 802-810 of the method 800), for example, by substantially expediting assembly of or reducing the cost of the aircraft 902. Similarly, one or more of apparatus embodiments, method embodiments, or a combination thereof may be utilized while the aircraft 902 is in service, at 812 for example and without limitation, to maintenance and service, at 814.

The illustrations of the examples described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than shown in the figures or one or more method steps may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. As the following claims reflect, the claimed subject matter may be directed to less than all of the features of any of the disclosed examples.

Examples described above illustrate but do not limit the disclosure. It should also be understood that numerous modifications and variations are possible in accordance with the principles of the present disclosure. Accordingly, the scope of the disclosure is defined by the following claims and their equivalents.

What is claimed is:

1. A method comprising:
   receiving image data at a first tracking system, wherein the image data represents a region in an image of a sequence of images;
   generating a first tracking fingerprint based on the image data;
   comparing the first tracking fingerprint and a second tracking fingerprint; and
   providing a prevent instruction from the first tracking system to a second tracking system based on a result of the comparison of the first tracking fingerprint and the second tracking fingerprint, wherein the prevent instruction instructs the second tracking system to refrain from modifying an object model based on the image data.

2. The method of claim 1, wherein the first tracking fingerprint is generated by applying a mathematical model to feature data extracted from the image data.

3. The method of claim 1, wherein comparing the first tracking fingerprint and the second tracking fingerprint comprises determining a difference between the first tracking fingerprint and the second tracking fingerprint based on a distance measurement between the first tracking fingerprint and the second tracking fingerprint.

4. The method of claim 1, further comprising:
   receiving second image data from a motion detector, wherein the second image data includes motion-triggered image data;
   generating a first particular tracking fingerprint based on the second image data;
   determining whether a difference between the first particular tracking fingerprint and a second particular tracking fingerprint is less than a first threshold value; and
   receiving a confidence value from the second tracking system, wherein the confidence value indicates a likelihood that the second tracking system is correctly tracking an object.

5. The method of claim 4, further comprising:
   determining whether the confidence value is less than a confidence threshold responsive to the difference being less than a first threshold value; and
   providing a location update instruction and the motion-triggered image data to the second tracking system responsive to the confidence value being greater than or equal to the confidence threshold.

6. The method of claim 5, further comprising:
   determining whether the difference is less than a second threshold value responsive to the confidence value being greater than the confidence threshold; and
   providing an object model re-initialization instruction and the motion-triggered image data from the first tracking system to the second tracking system responsive to the difference being less than the second threshold value.

7. The method of claim 6, wherein the object model re-initialization instruction instructs the second tracking system to generate a new object model based on the motion-triggered image data.

8. The method of claim 4, further comprising:
   determining whether the difference is less than a third threshold value; and
   storing the first particular tracking fingerprint in a memory responsive to the difference being less than the third threshold value.

9. The method of claim 1, wherein comparing the first tracking fingerprint and the second tracking fingerprint comprises determining whether a difference between the first tracking fingerprint and the second tracking fingerprint is less than a fourth threshold value.

10. The method of claim 9, wherein the a prevent instruction is provided to the second tracking system responsive to the difference being greater than or equal to the fourth threshold value.

11. The method of claim 1, further comprising subsequent to providing the prevent instruction from the first tracking system to the second tracking system:
   receiving second image data from a motion detector, wherein the second image data includes motion-triggered image data; and
   providing an object model modification instruction from the first tracking system to the second tracking system, wherein the object model modification instruction instructs the second tracking system to modify the object model based on the motion-triggered image data.

12. The method of claim 1, further comprising providing a location update instruction from the first tracking system to the second tracking system, wherein the location update instruction instructs the second tracking system to set a tracking location based on location information received from the first tracking system.

13. A tracking system comprising:
   one or more processors; and
   a memory coupled to the one or more processors, the memory storing instructions that, when executed by the one or more processors, cause the one or more processors to perform operations comprising:
   receiving image data representing a region in an image of a sequence of images;
   generating a first tracking fingerprint based on the image data;
   comparing the first tracking fingerprint and a second tracking fingerprint; and
   providing a prevent instruction to a second tracking system based on a result of the comparison of the first tracking fingerprint and the second tracking fingerprint, wherein the prevent instruction instructs the second tracking system to refrain from modifying an object model based on the image data.

14. The tracking system of claim 13, wherein the sequence of images is received from an image capture device, and wherein the one or more processors, the memory, and the image capture device are integrated in an autonomous vehicle.

15. The tracking system of claim 14, wherein the second tracking system is configured to provide location data to a server, to another system of the autonomous vehicle, or a combination thereof.

16. A non-transitory computer readable medium storing instructions that, when executed by a processor, cause the processor to perform operations comprising:
receiving image data at a first tracking system, wherein the image data represents a region in an image of a sequence of images;
generating a first tracking fingerprint based on the image data;
comparing the first tracking fingerprint and a second tracking fingerprint; and
providing a prevent instruction from the first tracking system to a second tracking system based on a result of the comparison of the first tracking fingerprint and the second tracking fingerprint, wherein the prevent instruction instructs the second tracking system to refrain from modifying an object model based on the image data.

17. The non-transitory computer readable medium of claim 16, wherein the operations further comprise providing an object model re-initialization instruction from the first tracking system to the second tracking system, wherein the object model re-initialization instruction instructs the second tracking system to generate a new object model.

18. The non-transitory computer readable medium of claim 17, wherein the object model re-initialization instruction enables the second tracking system to re-acquire an object in a subsequent image of the sequence of images after the object is at least partially occluded in one or more images of the sequence of images.

* * * * *